(12) United States Patent
Park et al.

(10) Patent No.: US 7,990,636 B2
(45) Date of Patent: Aug. 2, 2011

(54) LENS ACTUATING MODULE (75) Inventors: Chuel Jin Park, Gyunggi-do (KR); Dong Kyun Lee, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/703,141

(22) Filed: Feb. 9, 2010

(65) Prior Publication Data

US 2011/0149421 A1   Jun. 23, 2011

(30) Foreign Application Priority Data

Dec. 18, 2009  (KR) .................. 10-2009-0127133

(51) Int. Cl.
G03B 7/02 (2006.01)

(52) U.S. Cl. ........................ 359/824; 359/819

(58) Field of Classification Search .............. 359/696, 359/698, 704, 819, 824
See application file for complete search history.

(56) References Cited

U.S. PATENT DOCUMENTS 7,262,927 B1 * 8/2007 Shyu et al. ............. 359/823
2011/0063741 A1 * 3/2011 Park et al. .............. 359/823
* cited by examiner Primary Examiner — Alicia M Harrington
(74) Attorney, Agent, or Firm — Blakely Sokoloff Taylor & Zafman LLP (57) ABSTRACT Disclosed herein is a lens actuating module. In the lens actuating module, a housing has an installation space therein. A lens barrel is disposed in the installation space of the housing. The lens barrel includes a lens. An actuating means is provided at a first position in the installation space of the housing in an optical axial direction. The actuating means is connected to the lens barrel to move the lens barrel. A base magnet is provided at a second position in the installation space of the housing. A lens magnet is mounted to the outer surface of the lens barrel at a position facing the base magnet to generate a repulsive force between the lens magnet and the base magnet.

13 Claims, 6 Drawing Sheets

LENS ACTUATING MODULE

CROSS REFERENCE TO RELATED APPLICATION

This application claims the benefit of Korean Patent Application No. 10-2009-0127133, filed Dec. 18, 2009, entitled "Lens actuating module", which is hereby incorporated by reference in its entirety into this application.

BACKGROUND OF THE INVENTION

1. Technical Field

The present invention relates to a lens actuating module.

2. Description of the Related Art

Generally, digital cameras are devices which store an image in such a way as to convert light entering a lens into a digital signal using an image sensor (CCD & CMOS) and output the stored image. The digital cameras are applied to various fields, for example, mobile devices, etc.

Typically, for the sake of convenience when used, such a digital camera has various functions, such as an auto-focusing (AF) function, an optical zoom function, an auto-shutter function, an anti-shaking function, etc. In particular, in the case of a digital camera installed in a mobile device, corresponding to the increase in the number of pixels, research into auto-focus and optical zoom has mainly been conducted.

Meanwhile, a lens actuating module used in a camera according to a conventional art includes a housing, a lens barrel which is provided with a lens, an actuating means which moves the lens barrel in an optical axial direction, and a spring which couples the lens barrel to the actuating means.

In the lens actuating module, a stepping motor, a VCM motor, a piezoelectric ultrasonic motor, etc. can be used as the actuating means. The piezoelectric ultrasonic motor is operated in such a way that it converts vibrations of the piezoelectric actuator, including expansion and contraction, generated when electricity is applied thereto into circular or linear motion using friction between a stator and a mover (or rotator). The piezoelectric ultrasonic motor has high energy density, rapid response speed and high position accuracy, compared to an electromagnetic drive motor. Furthermore, the piezoelectric ultrasonic motor has an off-power holding function. In addition, the piezoelectric ultrasonic motor does not generate noise when operating and is not affected by electromagnetic waves.

The piezoelectric ultrasonic motor which is used as the actuating means is oriented in the direction corresponding to the optical axial direction of the lens barrel. Thus, when an ultrasonic signal is applied to the actuating means, the piezoelectric ultrasonic motor expands or contracts in the optical axial direction, thus moving the lens barrel for conducting auto-focusing function.

The spring provides a preload for stable coupling between the lens barrel and the actuating means and reliable operation thereof. The spring is supported by a housing and biases the lens barrel towards the drive means such that an appropriate preload is applied therebetween.

However, in the conventional structure in which a preload is applied between the actuating means and the lens barrel by the spring, mechanical coupling is complicated, and mechanical deformation may be induced.

SUMMARY OF THE INVENTION

The present invention has been made in an effort to provide a lens actuating module which is constructed such that a preload is applied between a lens barrel and an actuating means using the repulsive force of magnets rather than a mechanical coupling method.

In a lens actuating module according to an embodiment of the present invention, a housing has an installation space therein. A lens barrel is disposed in the installation space of the housing. The lens barrel includes a lens. An actuating means is provided at a first position in the installation space of the housing in an optical axial direction. The actuating means is connected to the lens barrel to move the lens barrel. A base magnet is provided at a second position in the installation space of the housing. A lens magnet is mounted to the outer surface of the lens barrel at a position facing the base magnet to generate a repulsive force between the lens magnet and the base magnet.

The actuating means may comprise a piezoelectric actuator expanding or contracting in the optical axial direction to generate drive force when power is applied thereto. A rod may connect the piezoelectric actuator to the lens barrel to transmit the drive force of the piezoelectric actuator to the lens barrel. A mounting member may fasten the piezoelectric actuator to the housing.

The base magnet may extend a predetermined length along a path along which the lens barrel moves. The lens magnet may be shorter than the base magnet such that the lens magnet moves within a range corresponding to the length of the base magnet.

Furthermore, a rod support may protrude from the outer surface of the lens barrel. The rod may be fitted into the rod support. A magnet support may protrude from the outer surface of the lens barrel. The lens magnet may be fitted into the magnet support.

In the lens actuating module, a sensing unit may sense a position of the lens barrel. The sensing unit may comprise a hall sensor or a photo interrupter sensor.

In addition, a drive unit may operate the actuating means. A control unit may calculate the position of the lens barrel using a sensing signal transmitted from the sensing unit. The control unit may determine whether the lens barrel is at a suitable position, and controlling the drive unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components. In the following description, when it is determined that the detailed description of the conventional function and conventional structure would confuse the gist of the present invention, such a description may be omitted. Furthermore, the terms and words used in the specification and claims are not necessarily limited to typical or dictionary meanings, but must be understood to indicate concepts selected by the inventor as the best method of illustrating the present invention, and must be interpreted as having had their meanings and concepts adapted to the scope and spirit of the present invention so that the technology of the present invention could be better understood.

Hereinafter, embodiments of the present invention will be described in detail with reference to the attached drawings.

Figure 1:
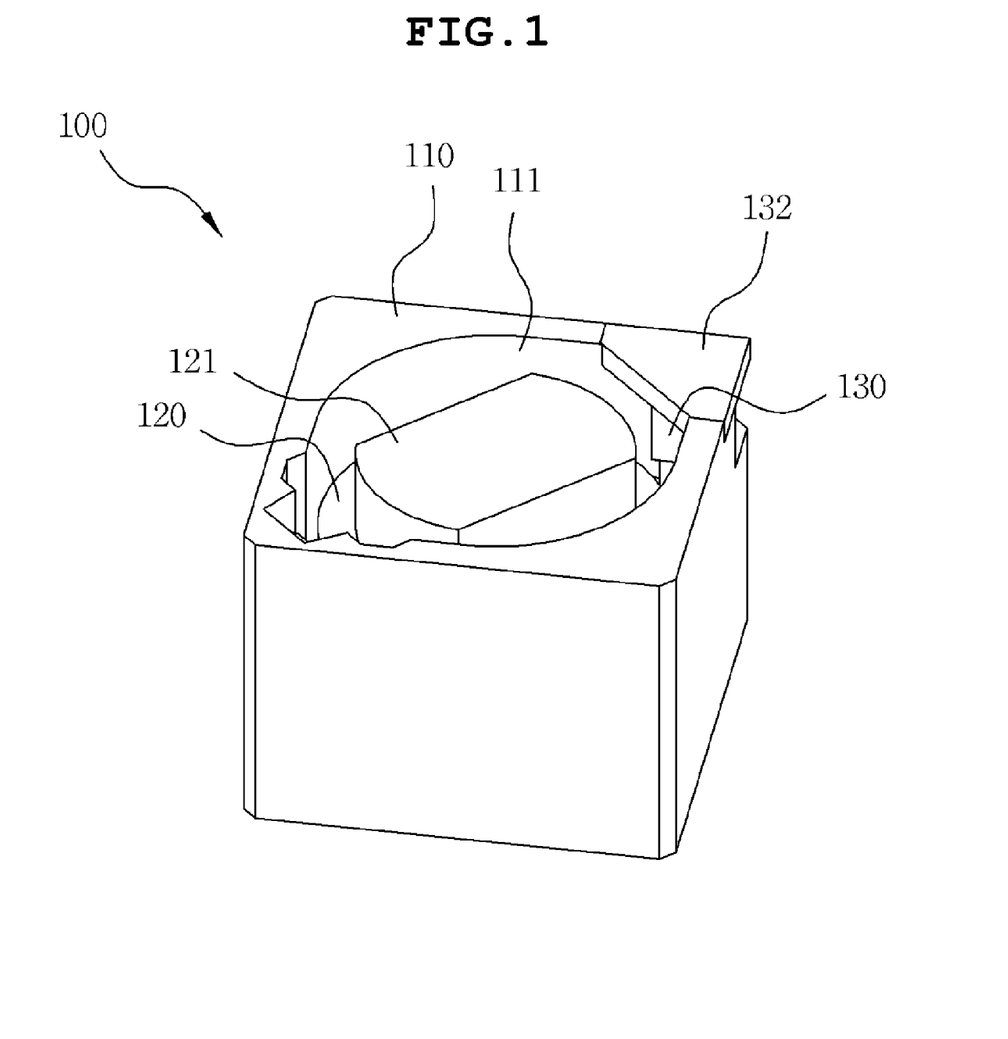
FIG. 1 is a perspective view of a lens actuating module, according to a first embodiment of the present invention.
Figure 2:
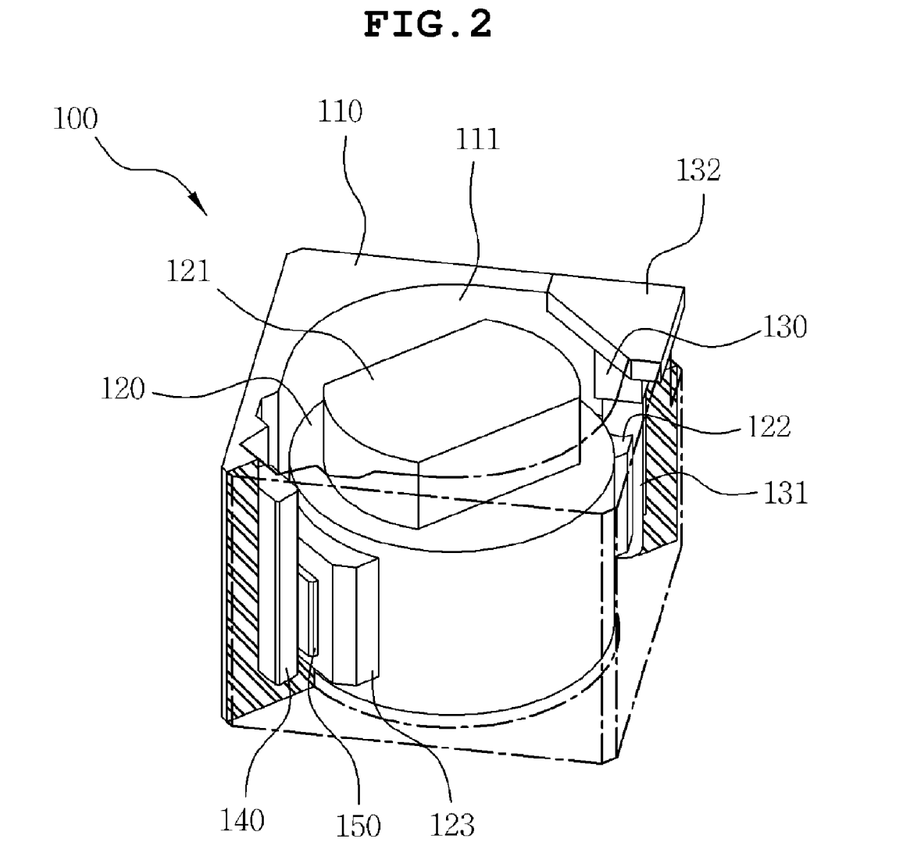
FIG. 2 is a partially broken perspective view of a housing of the lens actuating module of FIG. 1.
Figure 3:
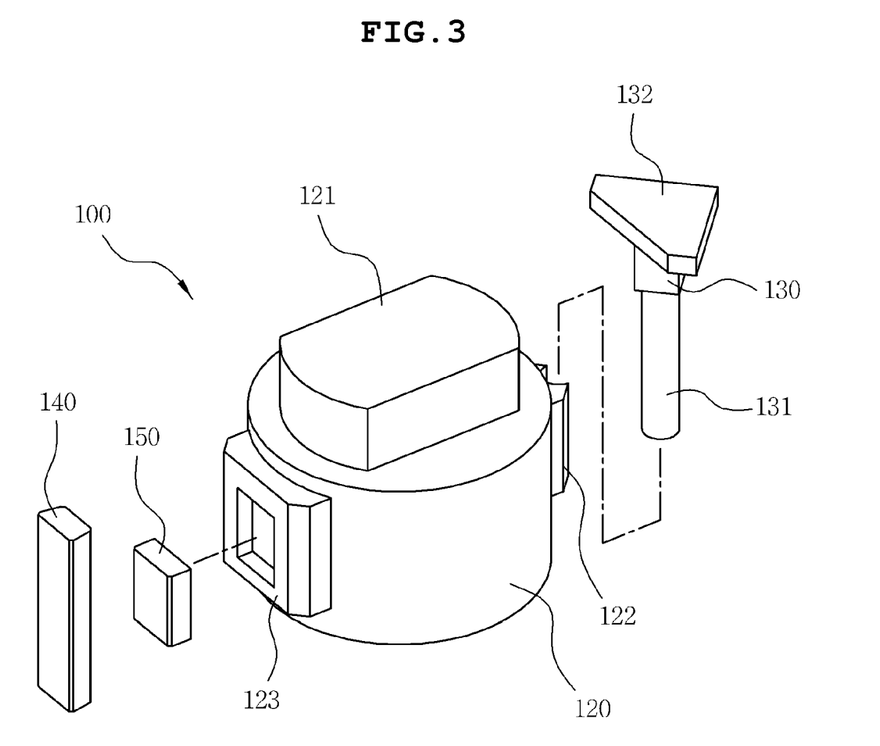
FIG. 3 is an exploded perspective view showing a critical portion of FIG. 1.
Figure 4:
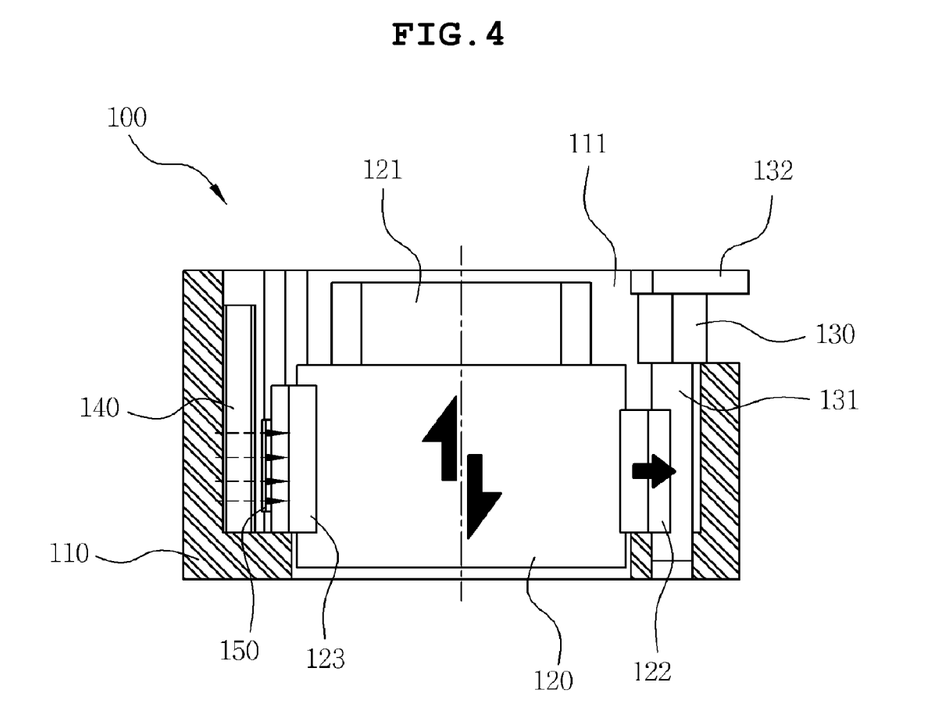
FIG. 4 is a sectional view of FIG. 1.
Figure 5:
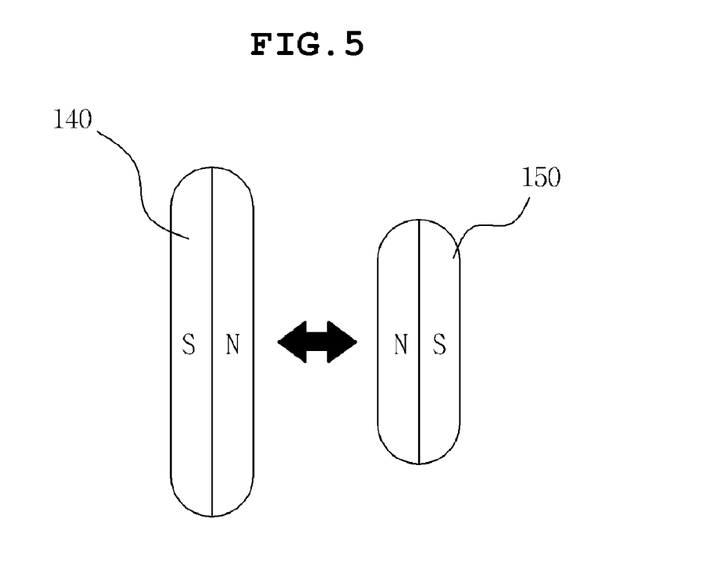
FIG. 5 is a side view showing an actuating means of the lens actuating module of FIG. 1.
Figure 6:
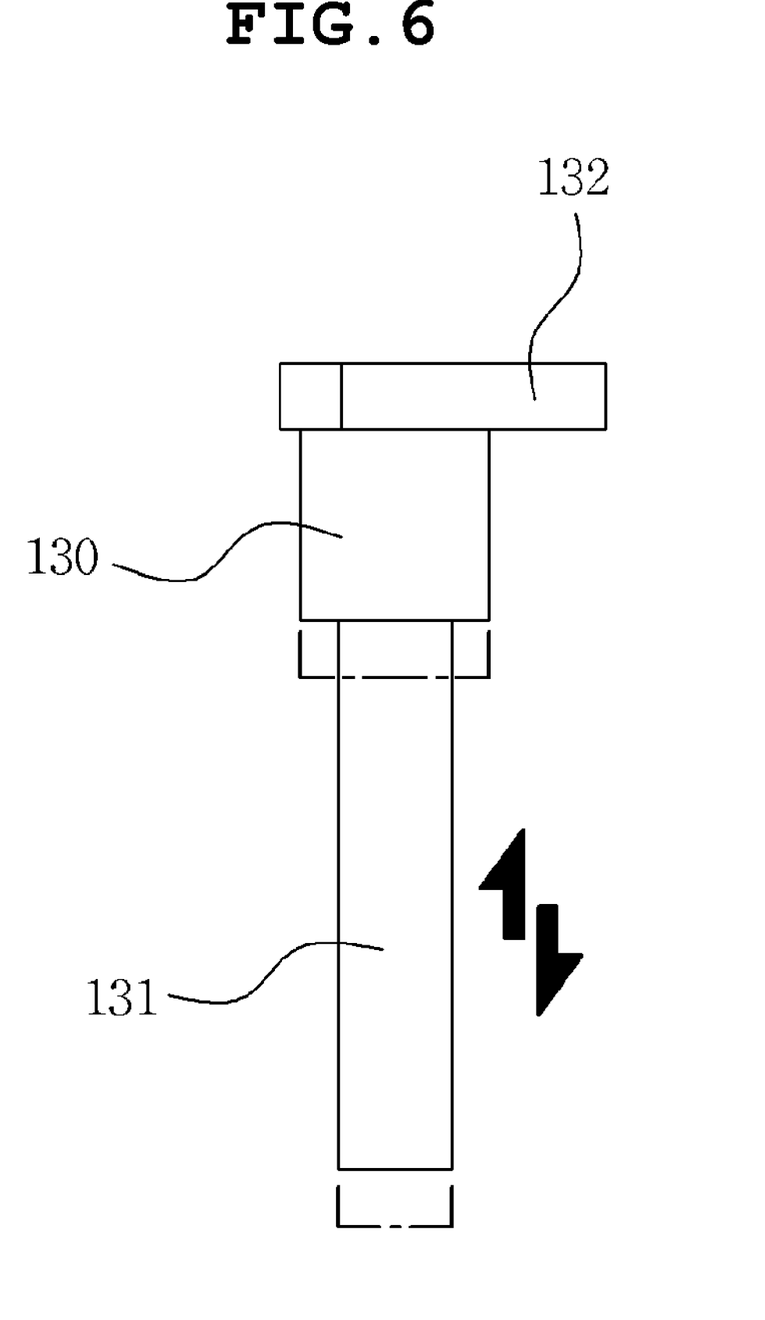
FIG. 6 is a conception view illustrating the effect of repulsive force between a base magnet and a lens magnet.

FIG. 1 is a perspective view of a lens actuating module 100, according to a first embodiment of the present invention. FIG. 2 is a partially broken perspective view of a housing 110 of the lens actuating module 100. FIG. 3 is an exploded perspective view showing a critical portion of FIG. 1. FIG. 4 is a sectional view of FIG. 1. FIG. 5 is a side view showing an actuating means of the lens actuating module. FIG. 6 is a conception view illustrating the effect of repulsive force between a base magnet 140 and a lens magnet 150.

As shown in FIGS. 1 through 6, the lens actuating module 100 according to the first embodiment of the present invention includes the housing 110, a lens barrel 120, the actuating means, the base magnet 140 and the lens magnet 150.

The housing 110 has an installation space 111 therein. The lens barrel 120 is disposed at the central portion of the installation space 111 in the housing 110 so as to be movable in the optical axial direction. The actuating means and the base magnet 140 are respectively disposed on opposite sides of the lens barrel 120 in the installation space 111. For example, if the housing 110 has a hexahedral shape, the installation space 111 in which the lens barrel 120 is installed is formed in the central portion of the housing 110, and the actuating means and the base magnet 140 are disposed in the installation space 111 at opposite corners of the housing 110. In this case, the housing 110 can be reduced in width. The portion of the installation space 111 in which the lens barrel 120 is disposed is formed through the housing 110. The portions of the installation space 111 in which the actuating means and the base magnet 140 are disposed have recessed shapes, in other words, have bottom surfaces on which are supported the actuating means and the base magnet 140.

The lens barrel 120 functions to focus an external image using a lens 121. The lens barrel 120 is disposed in the installation space 111 and includes the lens 121 therein. The lens 121 comprises a group of lenses including at least one lens. The group of lenses is arranged in the lens barrel 120.

Furthermore, a rod support 122 is provided at a predetermined position on the outer surface of the lens barrel 120 to support a rod 131 of the actuating means. The actuating means can be coupled to the lens barrel 120 by various methods. For example, in the case where the rod 131 is provided on the end of the actuating means such that it is coupled to the lens barrel 120, the rod support 122 is configured such that the rod 131 is fitted into the rod support 122 or, in the fitted state, the coupling therebetween is complemented by a method, such as adhesion or fusion. The rod support 122 illustrated as one example in the drawings is open on one side thereof so that the rod 131 is fitted into the open side of the rod support 122. Due to this, the rod support 122 which holds the rod 131 in the installation space 111 of the housing 110 is prevented from being interfered with by the inner surface of the housing 110.

Meanwhile, a magnet support 123 is provided at a predetermined position on the outer surface, and a lens magnet 150 is fitted into and supported by the magnet support 123. Here, to fasten the lens magnet 150 to the lens barrel 120, various methods, such as adhesion, fusion, etc., can be used. In the embodiment, the magnet support 123 is used as a means for further reliably fastening the lens magnet 150 to the lens barrel 120. The magnet support 123 has a shape in which it protrudes from the outer surface of the lens barrel 120. In detail, as shown in FIG. 3, the magnet support 123 protrudes from the outer surface of the lens barrel 120, and a depression into which the lens magnet 150 is fitted is formed in the central portion of the magnet support 123.

In the embodiment, the installation space 111 of the housing 110 and the lens barrel 120 generally have cylindrical shapes. In this case, a guide protrusion (not shown) and a guide groove (not shown) may be formed on the outer surface of the lens barrel 120 and the inner surface of the installation space 111 of the housing 110 which contains the lens barrel 120 therein. The guide protrusion and the guide groove function to guide movement of the lens barrel 120 with respect to the optical axial direction. Here, the guide protrusion and the guide groove may extend in a linear direction or, alternatively, in a spiral direction.

The actuating means is disposed in the corresponding side of the installation space 111 and oriented in the optical axial direction. The actuating means is coupled to the lens barrel 120 to move the lens barrel 120 in the optical axial direction. Various devices, for example, a stepping motor, a VCM motor, a piezoelectric actuator 130, etc. can be used as the actuating means.

In the first embodiment of the present invention, the actuating means comprises the piezoelectric actuator 130 which is constructed such that when power is applied thereto, it expands or contracts in the optical axial direction to generate actuating force. In this case, the piezoelectric actuator 130 is fastened at a first end thereof to the housing 110 and coupled at a second end thereof to the lens barrel 120. Thus, the lens barrel 120 is moved in the optical axial direction by expansion or contraction of the piezoelectric actuator 130.

To fasten the piezoelectric actuator 130 used as the actuating means to the housing 110 and couple the piezoelectric actuator 130 to the lens barrel 120, as shown in FIG. 6, the piezoelectric actuator 130 includes the rod 131 and a mounting member 132. The rod 131 which extends a predetermined length is attached at a first end thereof to the piezoelectric actuator 130 and coupled at a second end thereof to the lens barrel 120.

Thus, the drive force of the piezoelectric actuator 130 is transmitted to the lens barrel 120 through the rod 131. The mounting member 132 has a planar shape. The piezoelectric actuator 130 is attached to the central portion of the mounting member 132. The periphery of the mounting member 132 is fastened to the upper end of the housing 110.

The base magnet 140 is disposed in the installation space 111 at a position opposing the actuating means. The base magnet 140 may have a rod shape having a predetermined length.

The lens magnet 150 is mounted to the outer surface of the lens barrel 120 such that the lens magnet 150 faces the base magnet 140 to generate repulsive force therebetween.

As shown in FIG. 5, the base magnet 140 and the lens magnet 150 are oriented such that the same poles thereof face each other so that they are biased in the directions going away from each other. Thus, preload is applied to the lens barrel 120. Thereby, the lens barrel 120 is biased towards the actuating means. As such, because the preload is applied to the lens barrel 120 using the repulsive force between the base magnet 140 and the lens magnet 150, mechanical contact between the lens barrel 120 and the housing 110 is prevented. Thus, the movement of the lens barrel 120 resulting from the operation of the actuating means can become smoother. In addition, since the installation of the base magnet 140 and the lens magnet 150 is simple, the mechanical design of the lens actuating module can become easy and the production thereof can also be simplified.

In the embodiment, the base magnet 140 extends a relatively long length along a path along which the lens barrel 120 moves. The lens magnet 150 is relatively short and moves within a range corresponding to the length of the base magnet 140. In other words, the base magnet 140 and the lens magnet 150 are configured such that when the lens barrel 120 moves, the lens magnet 150 is prevented from being displaced from the range defined by the base magnet 140. Thereby, the constant repulsive force can be generated between the base magnet 140 and the lens magnet 150 regardless of the position of the lens barrel 120 within the range in which the lens barrel 120 moves.

Figure 7:
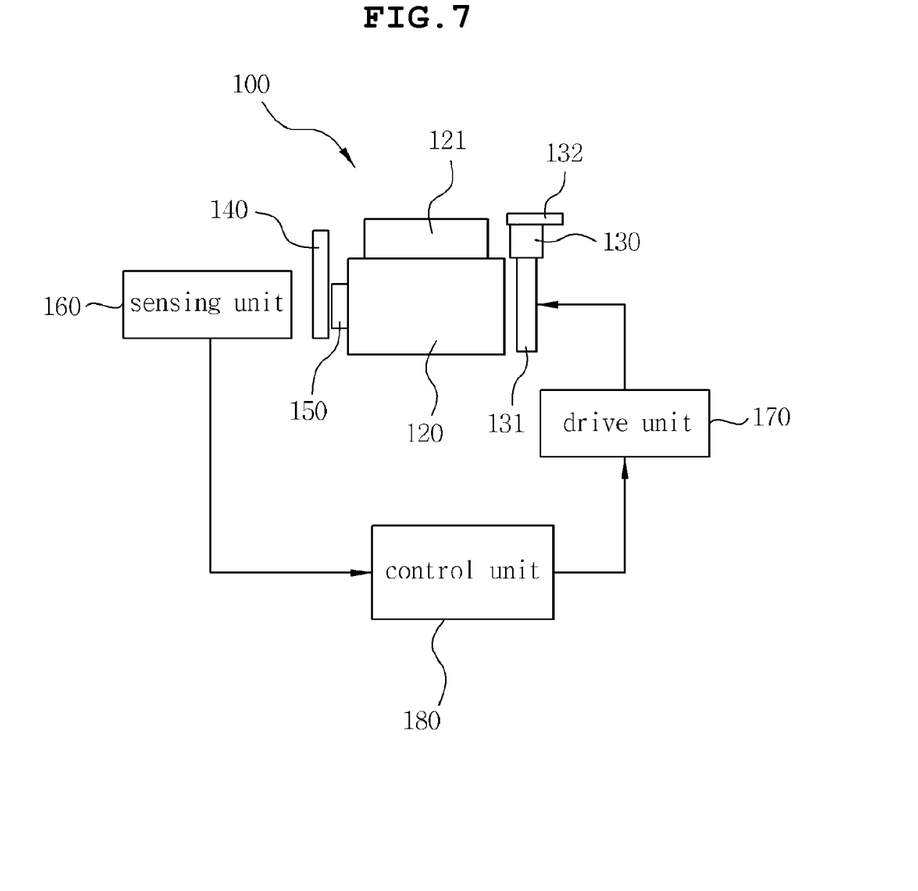
FIG. 7 is a view showing the construction of a lens actuating module, according to a second embodiment of the present invention.

FIG. 7 is a view showing the construction of a lens actuating module 100, according to a second embodiment of the present invention.

As shown in FIG. 7, the lens actuating module 100 according to the second embodiment of the present invention includes a sensing unit 160 which senses the position of the lens barrel 120.

In detail, the sensing unit 160 is installed in the housing 110 to sense the position of the lens barrel 120 which moves in the optical axial direction. For example, a hall sensor or a photo interrupter sensor can be used as the sensing unit 160.

The hall sensor senses the position of the lens barrel 120 in such a way as to measure variation in magnetic flux between the lens magnet 150 which moves along with the lens barrel 120 and the base magnet 140 which is fastened to the housing 110. The photo interrupter sensor senses the position of the lens barrel 120 using signal transmission between a light receiving element and a light emitting element which are installed between the housing 110 and the lens barrel 120.

The sensing unit 160 transmits a sensing signal to a control unit 180. The control unit 180 determines whether the position of the lens barrel 120 is suitable or not and corrects the position of the lens barrel 120 if it is not suitable.

Furthermore, in the lens actuating module 100 according to the second embodiment, a drive unit 170 operates the actuating means. The control unit 180 calculates the position of the lens barrel 120 using a sensing signal transmitted from the sensing unit 160, determines whether the position of the lens barrel 120 is suitable, and controls the drive unit 170. When the drive unit 170 applies power to the actuating means, for example, to the piezoelectric actuator 130, the control unit 180 controls the power which is applied to the piezoelectric actuator 130 from the drive unit 170.

As described above, in the present invention, preload is applied between a lens barrel and an actuating means by repulsive force of the magnets. Thus, the coupling of the lens barrel to the actuating means and the movement of the lens barrel can be reliably realized. In addition, mechanical contact is not required when the preload is applied. As a result, the performance and reliability of the lens actuating module can be enhanced, and the production efficiency thereof can also be increased.

Moreover, the present invention realizes a feedback system in which a sensing unit senses the position of the lens barrel and a control unit controls the actuating means in response to the sensed position of the lens barrel, thus further enhancing the reliability of a self-focusing function and an optical zoom function.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lens actuating module, comprising:
   a housing having an installation space therein;
   a lens barrel disposed in the installation space of the housing, the lens barrel comprising a lens;
   actuating means provided at a first position in the installation space of the housing in an optical axial direction, the actuating means being connected to the lens barrel to move the lens barrel;
   a base magnet provided at a second position in the installation space of the housing; and
   a lens magnet mounted to an outer surface of the lens barrel at a position facing the base magnet to generate a repulsive force between the lens magnet and the base magnet.

2. The lens actuating module as set forth in claim 1, wherein the actuating means comprises a piezoelectric actuator expanding or contracting in the optical axial direction to generate drive force when power is applied thereto.

3. The lens actuating module as set forth in claim 2, wherein a rod connects the piezoelectric actuator to the lens barrel to transmit the drive force of the piezoelectric actuator to the lens barrel.

4. The lens actuating module as set forth in claim 3, wherein a mounting member fastens the piezoelectric actuator to the housing.

5. The lens actuating module as set forth in claim 3, wherein a rod support protrudes from the outer surface of the lens barrel, and the rod is fitted into the rod support.

6. The lens actuating module as set forth in claim 2, wherein a mounting member fastens the piezoelectric actuator to the housing.

7. The lens actuating module as set forth in claim 1, wherein
   the base magnet extends a predetermined length along a path along which the lens barrel moves, and
   the lens magnet is shorter than the base magnet such that the lens magnet moves within a range corresponding to the length of the base magnet.

8. The lens actuating module as set forth in claim 7, wherein a magnet support protrudes from the outer surface of the lens barrel, and the lens magnet is fitted into the magnet support.

9. The lens actuating module as set forth in claim 1, wherein a magnet support protrudes from the outer surface of the lens barrel, and the lens magnet is fitted into the magnet support.

10. The lens actuating module as set forth in claim 1, further comprising:
    a sensing unit sensing a position of the lens barrel.

11. The lens actuating module as set forth in claim 10, wherein the sensing unit comprises a hall sensor or a photo interrupter sensor.

12. The lens actuating module as set forth in claim 11, further comprising:

a drive unit operating the actuating means; and a control unit calculating the position of the lens barrel using a sensing signal to transmitted from the sensing unit, the control unit determining whether the lens barrel is at a suitable position, and controlling the drive unit.

13. The lens actuating module as set forth in claim 10, further comprising:

a drive unit operating the actuating means; and a control unit calculating the position of the lens barrel using a sensing signal transmitted from the sensing unit, the control unit determining whether the lens barrel is at a suitable position, and controlling the drive unit.

* * * * *